United States Patent [19]
Yoshihara

[11] Patent Number: 5,899,440
[45] Date of Patent: May 4, 1999

[54] DIAPHRAGM VALVE

[75] Inventor: Koichi Yoshihara, Fujisawa, Japan

[73] Assignee: Freudenberg-NOK General Partnership, Plymouth, Mich.

[21] Appl. No.: 08/922,863

[22] Filed: Sep. 3, 1997

[51] Int. Cl.⁶ .................................................. F16K 31/126
[52] U.S. Cl. .............................. 251/331; 251/61.1; 92/96
[58] Field of Search ........................... 251/331, 61.1, 251/61.2, 61.4; 92/96, 98 R, 99

[56] References Cited

U.S. PATENT DOCUMENTS 4,715,578  12/1987  Seltzer ............................. 251/331 X
5,529,280   6/1996  Satoh et al. ........................ 251/331 X Primary Examiner—Kevin Lee
Attorney, Agent, or Firm—Dinnin & Dunn, P.C.

[57] ABSTRACT

A diaphragm valve having a diaphragm functioning as a valve body. Unlike the conventional valve of this type, the retainer for pressing the sealing section of the diaphragm against the valve seat is provided with a predetermined number of rectangular apertures or concave portions at specified positions thereon so that when the valve is operated in a low temperature atmosphere or a high temperature atmosphere, the diaphragm is prevented from sticking firmly to the valve sheet due to freezing or heating thereby allowing the valve to perform an accurate valve opening operation without changing its pressure and flow rate characteristics.

8 Claims, 6 Drawing Sheets

DIAPHRAGM VALVE

BACKGROUND OF THE INVENTION

1. Field of the Invention

The present invention relates to a valve and, more particularly, to a diaphragm valve having a diaphragm which functions as a valve body.

2. Prior Art

Diaphragm valves have conventionally been known and one of these valves will be described in detail hereinafter in relation to the preferred embodiments of the present invention. However, this known conventional diaphragm valve has had the disadvantage that due to the structural relationship between the diaphragm and the plate portion of the retainer for pressing the diaphragm, when the diaphragm valve is operated in a low temperature atmosphere around −30° C., the sealing section of the diaphragm sticks to the valve seat due to freezing while at the same time, when it is operated in a high temperature atmosphere, the like sticking phenomenon also takes place between the diaphragm and the valve seat due to heating of the diaphragm so that the pressure and flow rate characteristics of the valve changes greatly to thereby prevent the valve from performing an accurate valve opening operation.

SUMMARY OF THE INVENTION

The present invention has been made in view of the above-described disadvantage of the conventional diaphragm valve and an object of the present invention is to provide a diaphragm valve which is capable of opening in a low or high temperature atmosphere more accurately than the conventional diaphragm valve.

In order to achieve the above-mentioned object, the diaphragm valve according to the present invention comprises a diaphragm having a sealing section, a valve seat, a retainer and pressure means such as a spring for pressing the sealing section of the diaphragm against the valve seat through the retainer, wherein a predetermined number of apertures or concave portions are provided at specified positions along the circumference of the retainer behind the sealing section of the diaphragm.

Thus, with the above-described structure in which the predetermined number of apertures or concave portions are provided at specified positions along the circumference of the retainer behind the sealing section of the diaphragm, the pressure force of the spring for pressing the sealing section of the diaphragm is smaller at each of the positions on the sealing section circumferentially coinciding with the apertures or concave portions than at the remaining portion so that even when the sealing section of the diaphragm sticks to the valve seat over the entire circumference thereof due to freezing, such sticking force is smaller at the positions on the diaphragm coinciding with the apertures or concave portions than at the remaining portion of the sealing section of the diaphragm. Further, at those positions on the diaphragm which coincide with the apertures or concave portions, the diaphragm is so deformable elastically as to enter into the apertures or concave portions that even when the sealing section of the diaphragm is held in its closed state, the diaphragm can be lifted up. Accordingly, when the valve is opened, the sealing section of the diaphragm is first peeled off at the portions thereof corresponding to the apertures or concave portions and then the remaining portion is peeled off as it is stretched by the first peeled portions to thereby open the valve. The same action also takes place when the sealing section has adhered to the valve seat at the time of high-temperature operation of the valve.

Further, as the best mode for carrying out the invention, when a predetermined number of apertures or concave portions are provided at specified positions on the retainer behind the sealing section of the diaphragm, it is preferable that in consideration of keeping circumferential balance of the retainer, the apertures or concave portions be arranged equiangularly along the circumference of the retainer. Further, due to the fact that the retainer is generally made of a sheet metal, it is preferable that the sheet metal retainer be made to have such apertures or concave portions by press working.

BRIEF DESCRIPTION OF THE DRAWINGS

FIG. 10 is a enlarged view of an essential portion of the diaphragm valve of FIG. 8;

FIG. 12 is a graph showing the pressure and flow rate characteristics of the diaphragm valve of FIG. 8 especially when the valve is held in a low temperature atmosphere.

PREFERRED EMBODIMENTS OF THE INVENTION

Conventional Diaphragm Valve

Figure 8:
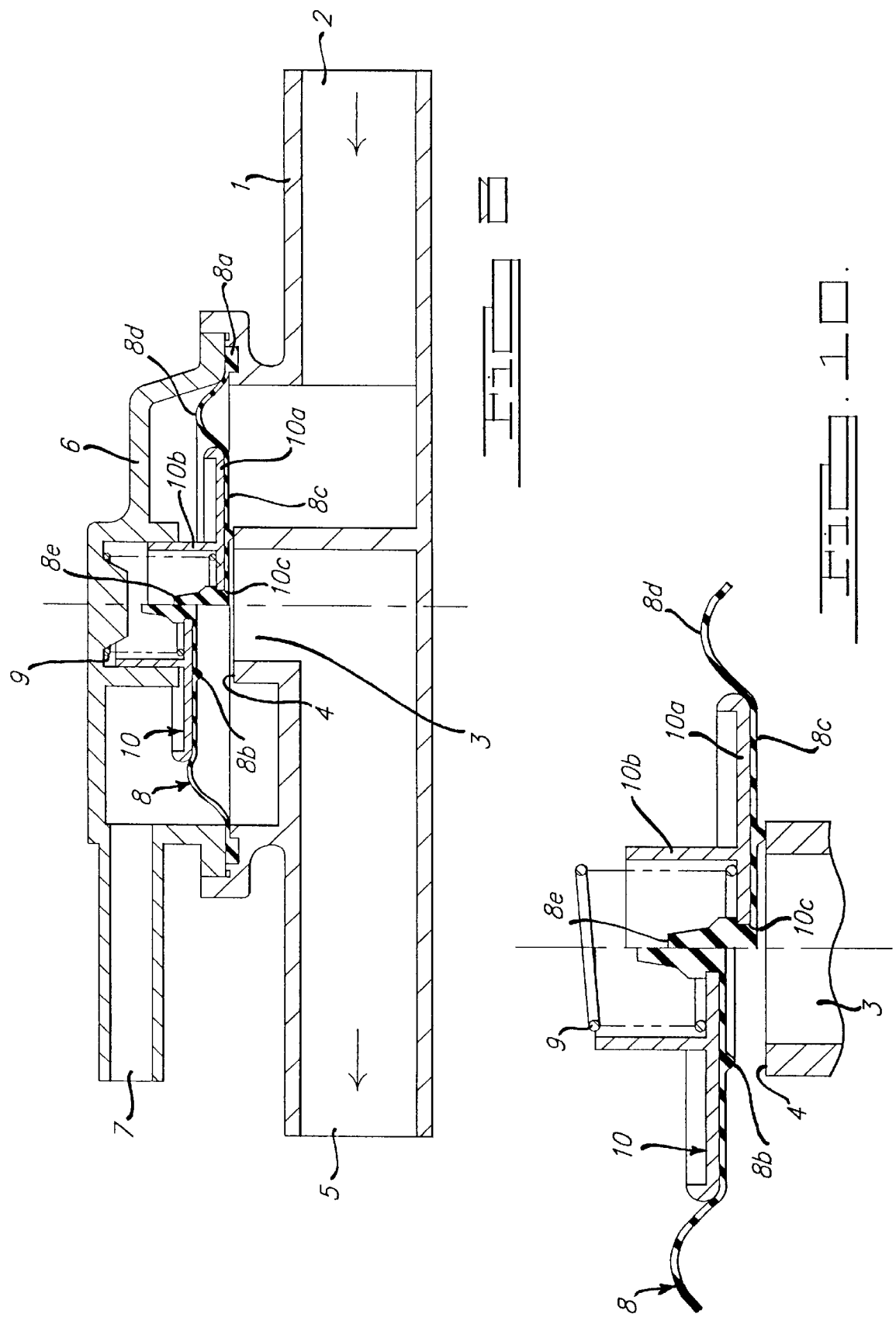
FIG. 8 is a sectional view of a conventional diaphragm valve.
Figure 9:
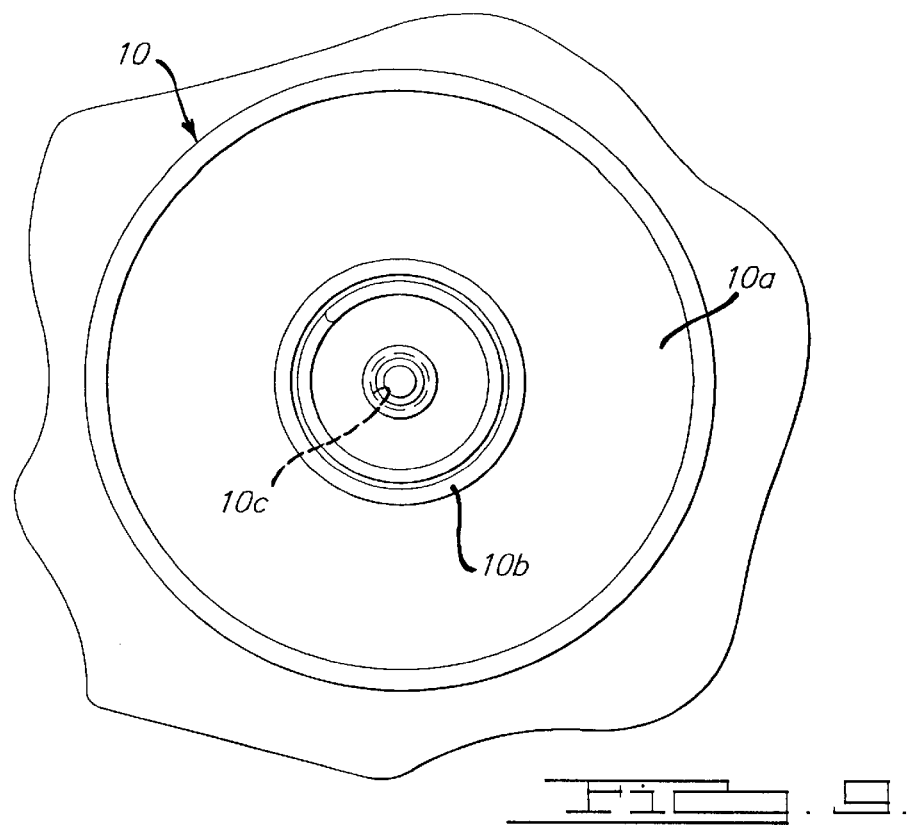
FIG. 9 is a plan view of a retainer of the diaphragm valve of FIG. 8.

Before describing the preferred embodiments of the present invention, the structure of one known conventional diaphragm valve will be described with reference to FIGS. 8 through 10 for comparison purposes.

As shown, this conventional diaphragm valve comprises a body 1 including an inlet port 2, a valve hole 3, a valve seat 4 and a flow-out port 5, a cap 6 provided with a pressure port 7 for introducing a negative pressure as a valve opening pressure at the time of opening the valve, a diaphragm 8 having its thick peripheral portion 8a clamped airtight between the body 1 and the cap 6, a retainer 10 and a spring 9 for pressing the diaphragm 8 against the valve seat 4 through the retainer 10.

The diaphragm 8 is made of a rubber-like elastic material and is laid over one of the surfaces of the retainer 10. Further, the diaphragm 8 includes a disk-shaped planar portion 8c provided with an annular sealing section 8b which is pressed against the valve seat 4 by means the spring 9, a bellows-like flexible section 8d integrally formed with the outer periphery of the plate portion 8c, the above-mentioned thick peripheral portion 8a integral with the outer periphery of the flexible section 8d and a projection 8e formed on the central portion of the upper surface of the planar portion 8c. The retainer 10 includes, as integral parts thereof a disk-like plate portion 10a and a cylindrical portion 10b for guiding the spring 9 and is provided at the center of the plate portion 10a with a pressure-fitting hole 10c into which the projection 8e of the diaphragm 8 is pressure-fitted.

However, in the case of this conventional diaphragm valve, since the lower surface of the plate portion 10a of the retainer 10 for pressing the diaphragm 8 are formed planar over the entire periphery thereof, the following problems arise.

Figure 11:
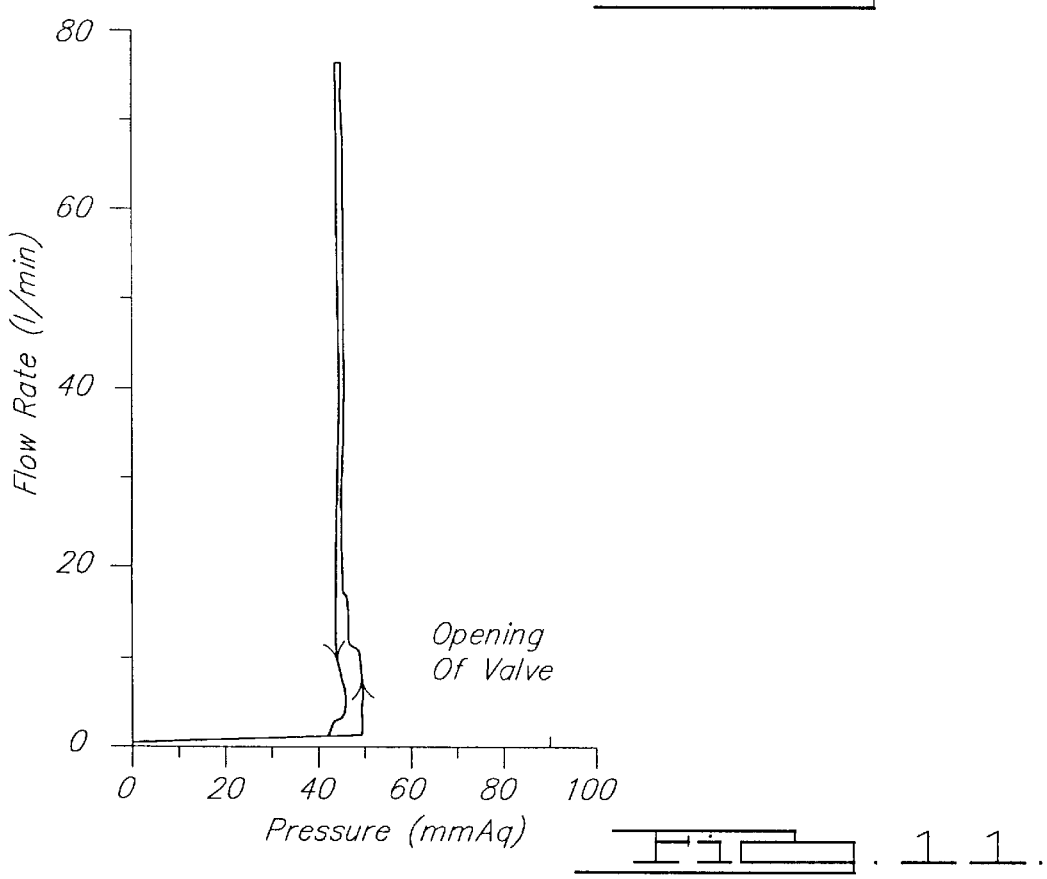
FIG. 11 is a graph showing pressure and flow rate characteristics of the diaphragm valve of FIG. 8 especially when the valve is held in a normal temperature atmosphere.
Figure 17:
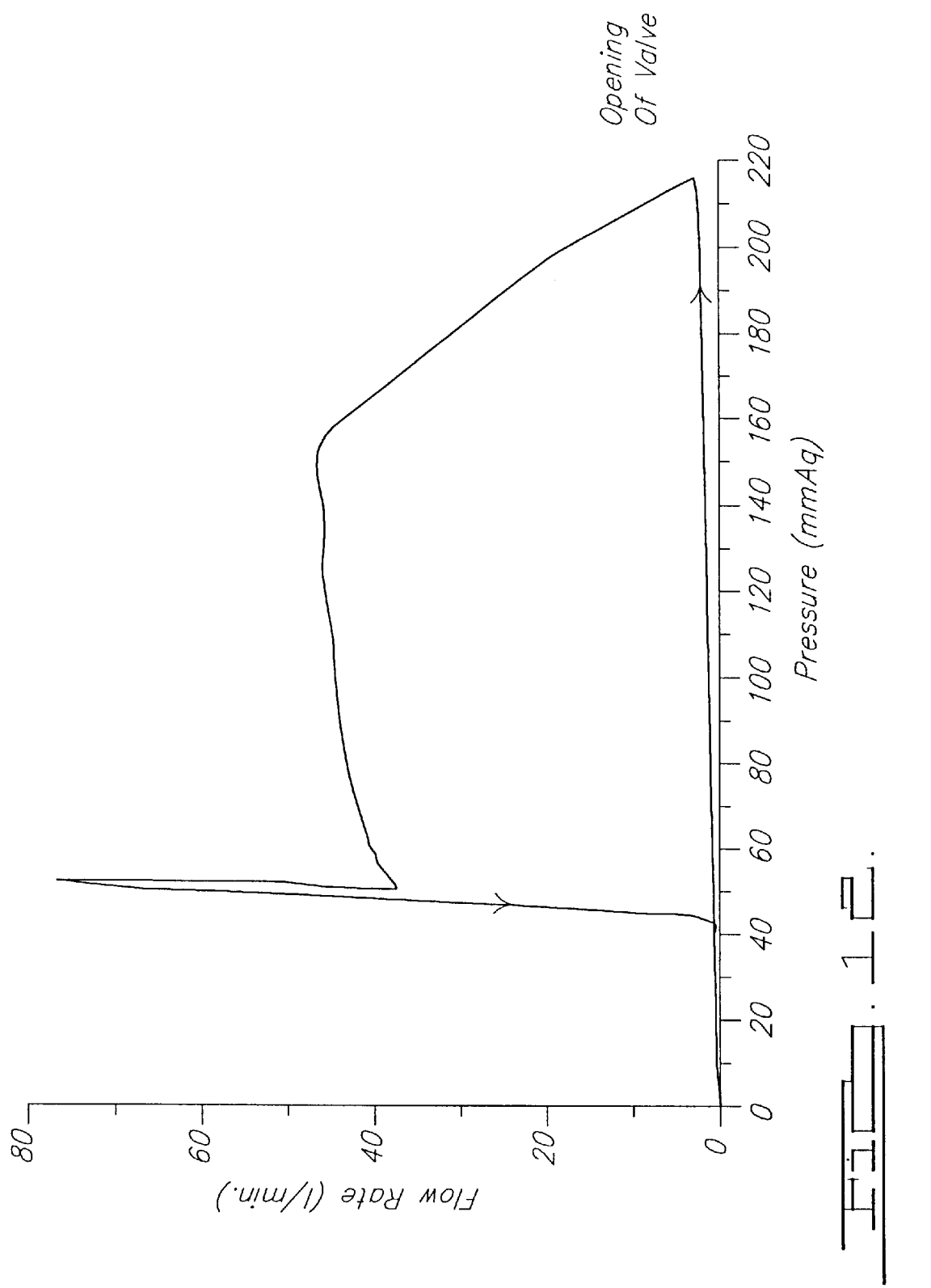

That is, as will be understood from FIG. 11 which is a graph showing the pressure and flow rate characteristics of the diaphragm valve at the time of normal temperature operation thereof, when the atmospheric temperature becomes around −30° C., the sealing section 8b of the diaphragm 8 sometimes sticks to the valve seat over the entire periphery thereof due to freezing and once it has stuck thereto, the valve does not open unless the stuck sealing section of the diaphragm 8 is peeled off so that the pressure and flow rate characteristics of the valve changes greatly as shown in FIG. 12. Accordingly, the valve does not open accurately. It is noted that the sticking force of the sealing section 8b of the diaphragm 8 to the valve seat 4 is considerably large because the sealing section 8b freezes to the valve seat 4 in the state of its being pressed against the valve seat 4 by means of the spring 9.

In this case, although such sticking phenomenon can be prevented by reducing the load applied on the spring 9, if the load is reduced, the pressure force of the spring 9 at normal temperature becomes insufficient thereby failing to secure a sufficient sealing performance for the valve.

Further, even when the diaphragm valve is operated in a high temperature atmosphere, it sometimes happens that the like sticking phenomenon takes place due to an increase in the adhesiveness of the rubber-like material of which the diaphragm is made so that no accurate valve opening operation is expected also at the time of high temperature operation of the valve.

First Embodiment

The preferred embodiments of the present invention will now be described with reference to the accompanying drawings.

Figure 1:
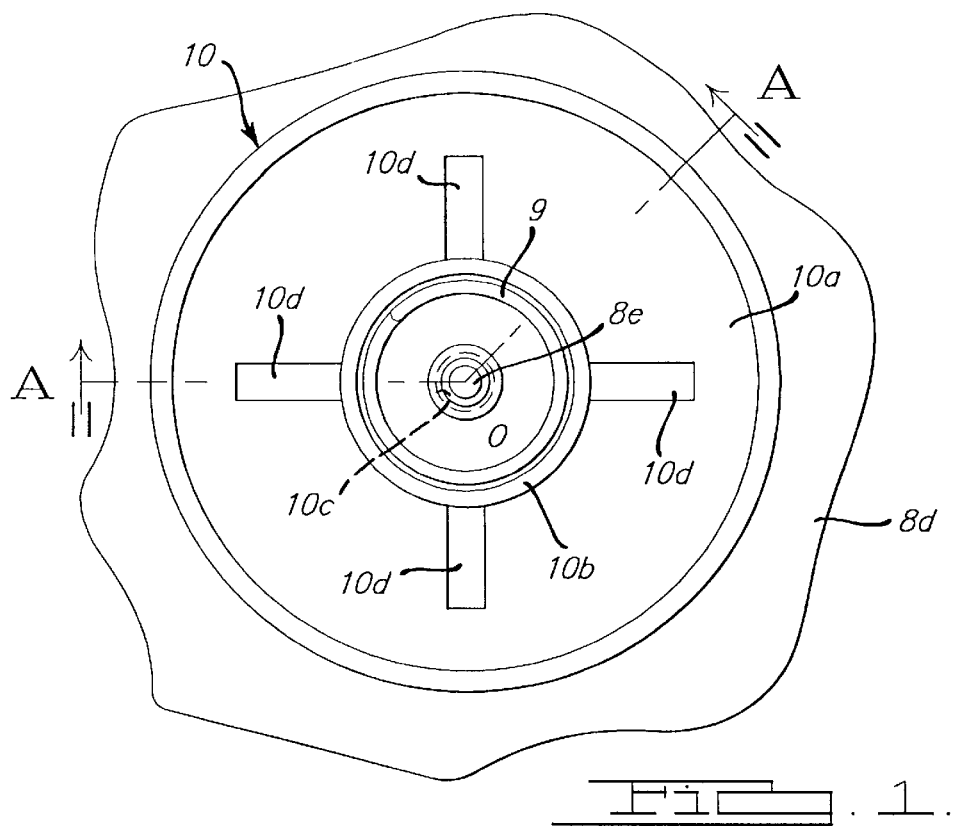
FIG. 1 is a plan view of a retainer of a diaphragm valve according to one embodiment of the present invention.
Figure 2:
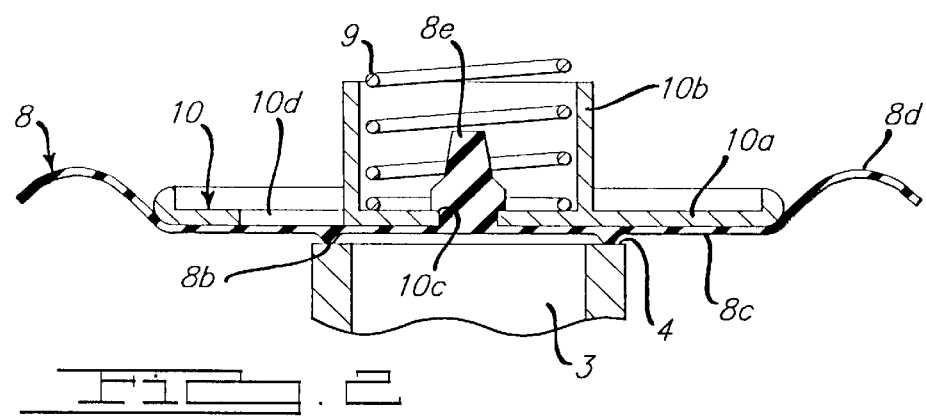
FIG. 2 is a sectional view of an essential portion of the diaphragm valve taken along the A—O—A line of FIG. 1.

FIGS. 1 and 2 show an essential portion of a diaphragm valve according to one embodiment of the present invention and the valve is characterized by the following structure. It is noted that the structures of the portions not shown in these figures are the same as those of the corresponding portions of the conventional diaphragm valve shown in FIG. 8.

As shown in FIGS. 1 and 2, the diaphragm valve according to this embodiment comprises a diaphragm 8 having a sealing section 8b, a valve seat 4, a retainer 10 having a plate portion 10a and pressure means such as a spring 9 for pressing the sealing section 8d of the diaphragm 8 against the valve seat 4 through the retainer 10. At positions on the plate portion 10a of the retainer 10 behind the sealing section 8b of the diaphragm 8, there are provided four equiangularly-spaced apertures 10d, respectively, each of which is substantially rectangular in shape and which passes through the plate portion 10a in the direction of thickness of the plate portion, so that the following effects are produced.

Figure 3:
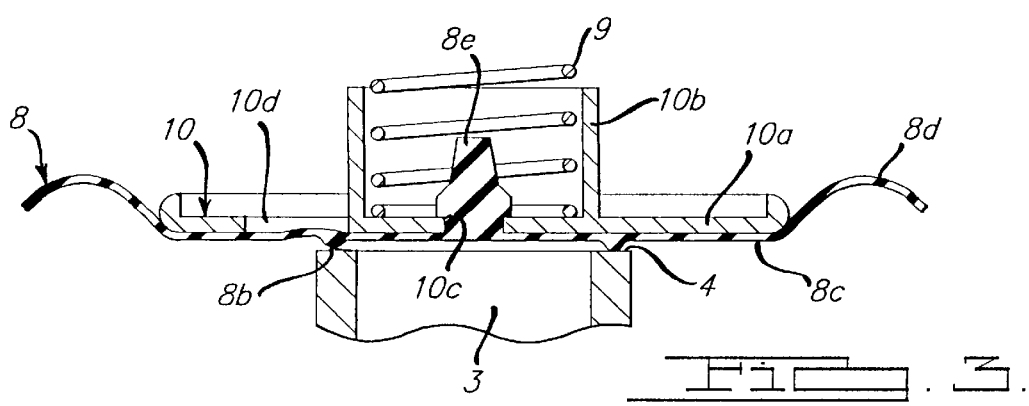
FIG. 3 is a sectional view similar to that shown in FIG. 2 with the view being given for illustrating an operation condition of the diaphragm valve.
Figure 4:
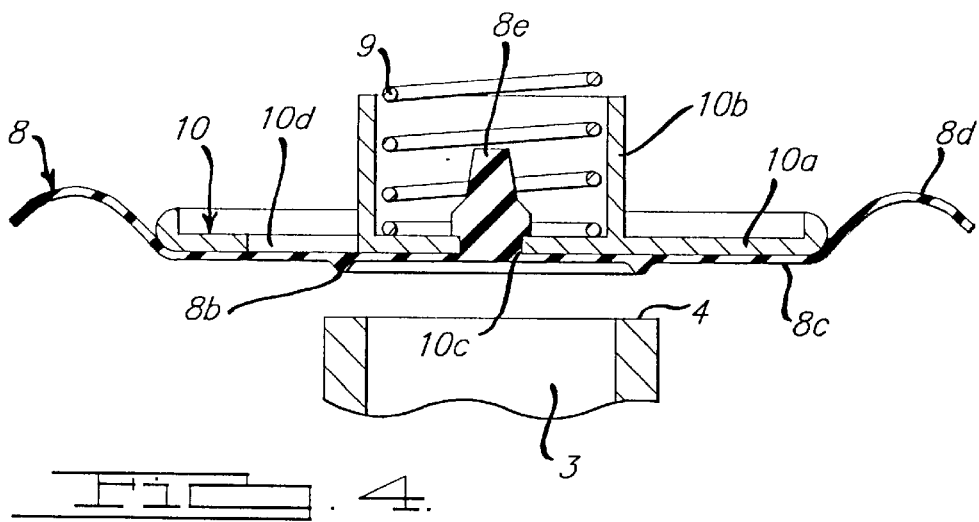
FIG. 4 is a sectional view of the essential portion of the diaphragm valve of FIG. 1 with the view showing an operation condition of the diaphragm valve.
Figure 5:
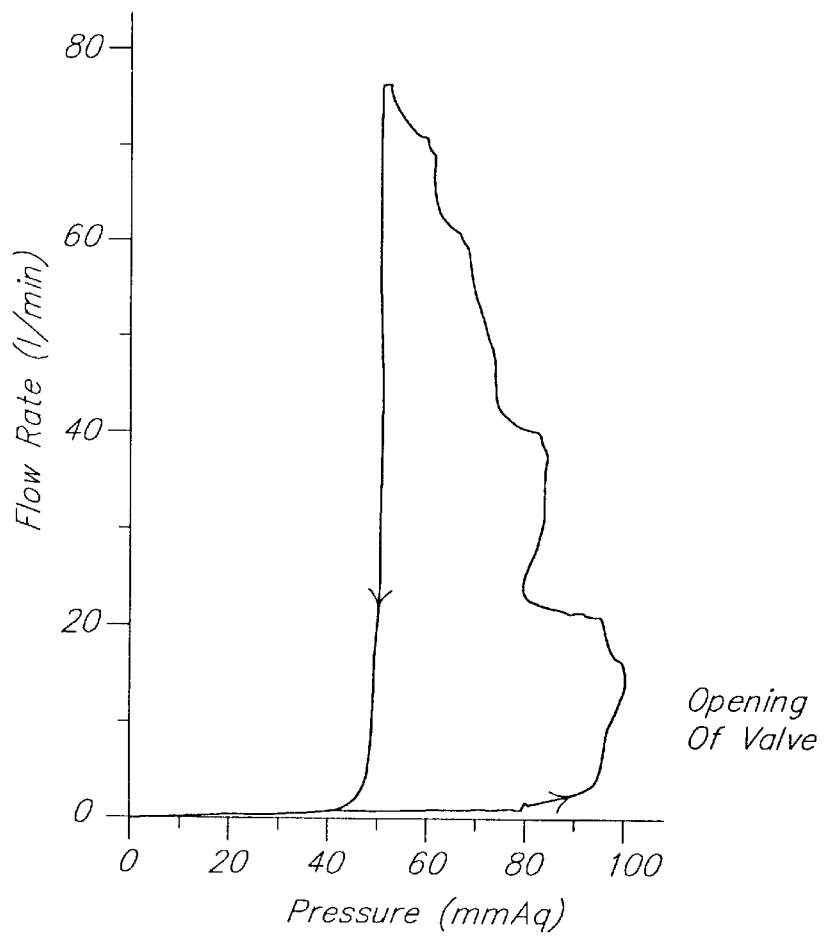
FIG. 5 is a graph showing the pressure and flow rate characteristics of the diaphragm valve of FIG. 1 especially when the diaphragm valve is held in a low temperature atmosphere.

That is, as shown in FIGS. 1 and 2, due to the provision of the four substantially rectangular and equiangularly-spaced apertures 10d along the plate portion 10a of the retainer 10 behind the sealing section 8b of the diaphragm 8, the pressure force of the spring 9 for pressing the sealing section 8b of the diaphragm 8 against the valve seat 4 is smaller at the positions on the sealing section 8b corresponding to the four apertures than at the remaining portion thereof so that even when the sealing section 8b has stuck to the valve seat 4 over the entire circumference thereof due to freezing, the sticking force at the positions on the sealing section 8b corresponding to the apertures 10d is smaller that that at the remaining portion. Further, a planar section 8c of the diaphragm 8 is so deformable as to enter into the apertures 10d at the positions on the former corresponding to the apertures so that even when the sealing section 8b of the diaphragm 8 is held open, it is possible to lift the sealing section 8b from the valve seat 4. Accordingly, when the diaphragm valve is opened, the sealing section 8b is first peeled off at positions corresponding to the apertures 10d as shown in FIG. 3 and then, as shown in FIG. 4, the remaining portion of the sealing section 8b is peeled off as it is stretched by the first peeled portions to thereby open the valve with the result that the pressure and flow rate characteristics of the diaphragm valve at low temperatures (around −30° C.) become as shown in FIG. 5. Accordingly, in contrast to the conventional valve shown in FIG. 12 in which the valve opening pressure is about 217 mmAq, the valve opening pressure of this embodiment becomes about 100 mmAq and it is therefore possible to realize an accurate valve opening operation by reducing the valve opening pressure by the difference between the two pressures. Further, since the load on the spring 9 is kept as it is, the sealing performance of the valve does not become worsened. Moreover, the same effect is produced when the sealing section of the diaphragm has adhered to the valve seat at the time of high temperature operation of the valve.

Second Embodiment

Figure 6:
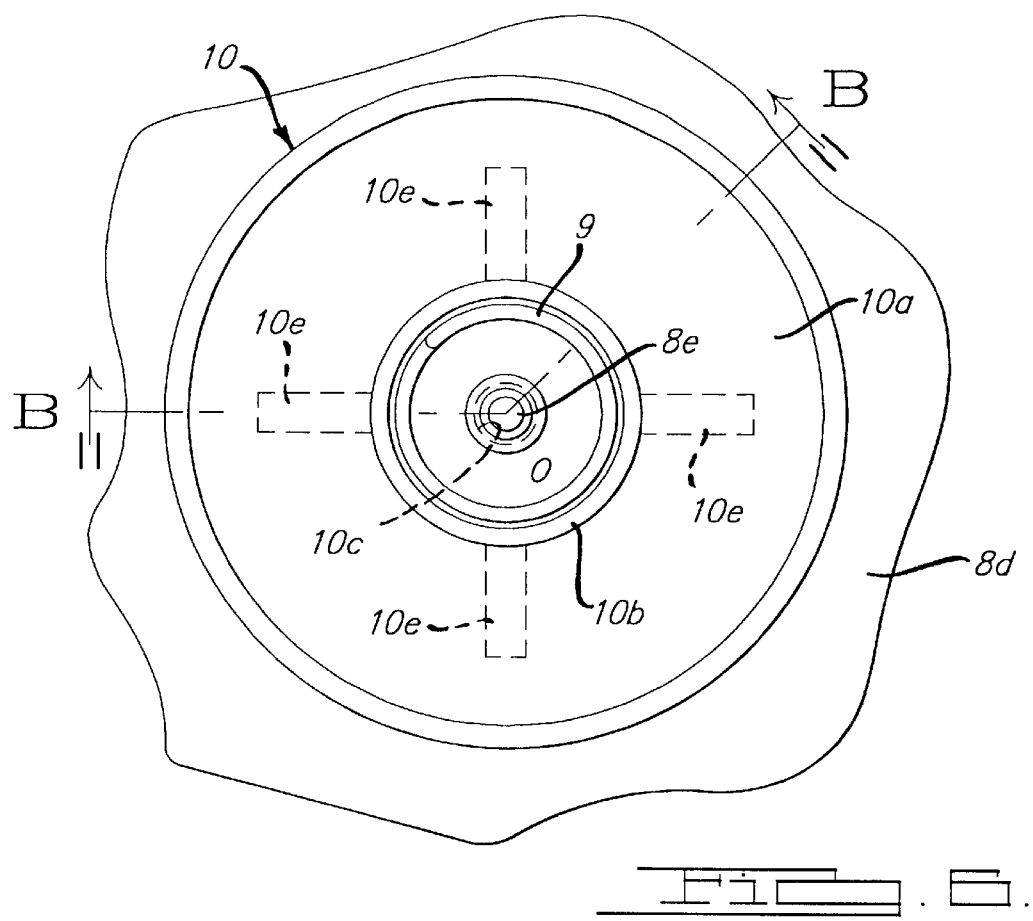
FIG. 6 is a plan view of a retainer of a diaphragm valve according to a second embodiment of the present invention.
Figure 7:
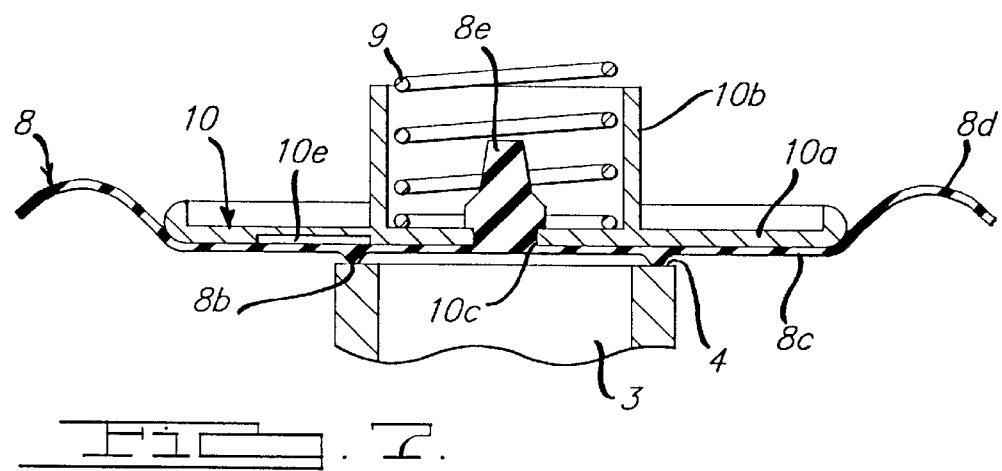
FIG. 7 is a sectional view of an essential portion of the diaphragm valve taken along the B—O—B line of FIG. 6.

FIGS. 6 and 7 show an essential portion of a diaphragm valve according to a second embodiment of the present invention and this valve is characterized by the following structure. It should be noted that the structures of the portions not shown in these figures are the same as those of the corresponding portions of the conventional diaphragm valve shown in FIG. 8.

As shown in FIGS. 6 and 7, there are provided four substantially rectangular and equiangularly-spaced concave portions 10e along the circumference of the plate portion 10a of the retainer 10 behind the sealing section 8b of the diaphragm 8 so that the following effect is produced. In this case, it is noted that each of the concave portions 10e is formed on one surface of the plate portion 10a of the retainer 10 (i.e., the lower surface of the plate portion 10a shown in FIG. 7) to a depth substantially half the thickness of the plate portion 10a of the retainer 10.

That is, due to the provision of the four substantially rectangular and equiangularly-spaced concave portions 10e along the plate portion 10a of the retainer 10 behind the sealing section 8b of the diaphragm 8, the pressure force of the spring 9 for pressing the sealing section 8b of the diaphragm 8 against the valve seat 4 is smaller at portions of the sealing section 8b corresponding to the four concave portions than at the remaining portion thereof so that even when the sealing section 8b has stuck to the valve seat 4 over the entire circumference thereof due to freezing, the sticking force at the positions on the sealing section 8b corresponding to the concave portions 10e is smaller than that at the remaining portion. Further, the planar section 8c of the diaphragm 8 is so deformable as to enter into the concave portions 10e at positions on the former corresponding to the concave portions so that even when the sealing section 8b of the diaphragm 8 is held open, it is possible to lift the sealing section 8b from the valve seat 4. Accordingly, when the diaphragm valve is opened, the sealing section 8b of the diaphragm 8 is first peeled off at positions corresponding to the concave portions 10e and then the remaining portion of the sealing section 8b is peeled off as it is stretched by the first peeled portions to thereby open the valve with the result that the pressure and flow rate characteristics of the diaphragm valve at low temperatures (around −30° C.) become as shown in FIG. 5. Accordingly, in contrast to the conventional diaphragm valve shown in FIG. 12 in which the valve opening pressure is about 217 mmAq, the valve opening pressure of this embodiment becomes about 100 mmAq and it is therefore possible to realize an accurate valve opening operation by reducing the valve opening pressure by the difference between the two pressures. Further, since the load on the spring 9 is kept as it is, the sealing performance of the valve does not become worsened. Moreover, the same effect is expected when the sealing section of the diaphragm has adhered to the valve seat at the time of high temperature operation of the valve.

It should be noted that according to the present invention, the number of the aperture 10d or the concave portion 10e is not always limited to four but it may be three or less or five or more as the case may be, provided that a space or spaces be provided at specified positions along the retainer behind the sealing section 8b of the diaphragm so that the valve opening operation may be quickened.

What is claimed is:

1. A diaphragm valve comprising a retainer having a plate portion, a diaphragm having a sealing section, a valve seat and a spring for pressing the sealing section of the diaphragm against the valve seat through the retainer, and characterized in that a predetermined number of apertures are respectively provided at positions along the plate portion of the retainer behind the sealing section of the diaphragm.

2. A diaphragm valve according to claim 1, wherein a predetermined number of concave portions are formed in place of said predetermined number of apertures.

3. A diaphragm valve according to claim 1, wherein the shape of each of said apertures is substantially rectangular.

4. A diaphragm valve according to claim 2, wherein the shape of each of said concave portions is substantially rectangular.

5. A diaphragm valve comprising a retainer having a plate portion, a diaphragm having a sealing section, a valve seat and pressure means for pressing the sealing section of the diaphragm against the valve seat through the retainer, and characterized in that a predetermined number of apertures are respectively provided at positions along the plate portion of the retainer behind the sealing section of the diaphragm.

6. A diaphragm valve according to claim 5, wherein a predetermined number of concave portions are formed in place of said predetermined number of apertures.

7. A diaphragm valve according to claim 5, wherein the shape of each of said apertures is substantially rectangular.

8. A diaphragm valve according to claim 6, wherein the shape of each of said concave portions is substantially rectangular.

\* \* \* \* \*